United States Patent Office 3,574,534
Patented Apr. 13, 1971

3,574,534
PRODUCTION OF SODIUM TRIPOLYPHOSPHATE HEXAHYDRATE
Kenneth J. Shaver, 32 Millbrook Lane 63122, and Chung Yu Shen, 9528 Laguna Drive 63132, both of St. Louis, Mo.
No Drawing. Filed July 25, 1967, Ser. No. 655,780
Int. Cl. C01b 25/30, 25/38
U.S. Cl. 23—107                            6 Claims

ABSTRACT OF THE DISCLOSURE

An improvement to the process wherein a strong base is added to an aqueous medium containing sodium trimetaphosphate to thereby form a hydrated sodium tripolyphosphate product, comprising adding an organic compound selected from the group consisting of nitrilotriacetic acid, ethylenediamine tetraacetic amino tri(methylene phosphonic acid), 1-hydroxy ethylidene diphosphonic acid, saturated polycarboxylic acids containing from 4 to 12 carbon atoms, the water soluble salts of said acids and mixtures thereof prior to adding the strong base; the weight ratio of said organic compound to said sodium trimetaphosphate being from about 1:1000 to about 2:1, respectively.

---

This invention relates to an improvement in the manufacture of sodium polyphosphate products as illustrated by essentially pure sodium tripolyphosphate hexahydrate and detergent products containing sodium tripolyphosphate hexahydrate. More particularly the invention relates to an improved process for preparing sodium tripolyphosphate products utilizing sodium trimetaphosphate as a raw material.

The advantages of utilizing sodium trimetaphosphate as a raw material in the production of sodium tripolyphosphate hexahydrate are well known in the art. In such processes for preparing sodium tripolyphosphate an aqueous medium containing sodium trimetaphosphate is generally prepared and thereafter a strong base such as sodium hydroxide is added to form a product containing sodium tripolyphosphate hexahydrate. Illustrative processes are described in U.S. Pat. 3,303,134 by Shen and Metcalf, Belgium Pat. 633,146 and Canadian Pat. 729,531. In some instances, however, particularly when heavy metals such as iron are present in the sodium trimetaphosphate such as when the material is proceeded from "wet" process phosphoric acid a relatively dark material is produced. By the practice of this invention it is possible to utilize sodium trimetaphosphate which is produced from the "wet process" phosphoric acid without the elaborate and expensive purification techniques that have heretofore been required in order to obtain a relatively light-colored product.

Additionally, although the viscosity of the medium containing sodium trimetaphosphate which is reacted to form sodium tripolyphosphate hexahydrate is considerably lower than in conventional detergent manufacturing processes utilizing anhydrous sodium tripolyphosphate, water in excess of that required to produce sodium tripolyphosphate, hexahydrate has to be used to achieve a suitable viscosity of the reaction slurry under many processing conditions. The product must be dried to remove the excess water. The removal of water frequently adds to the cost of the process and sometimes limits production rates.

It is believed, therefore, that a method enabling a light-colored sodium tripolyphosphate hexahydrate product to be produced from sodium trimetaphosphate contaminated with heavy metals such as iron would be an advancement in the art. Furthermore, it is believed that a method enabling a reduction in the amount of water utilized in forming the aqueous reaction medium would be an additional advancement in the art.

In accordance with this invention, it has been discovered that by incorporating certain organic compounds to be hereinafter described into the aqueous medium containing sodium trimetaphosphate prior to the addition of the strong base to form sodium tripolyphosphate hexahydrate product, a light-colored product is produced even if the sodium trimetaphosphate contains a relatively high level of iron contamination. Furthermore, it has been discovered that by incorporating these organic compounds in the amounts hereinafter specified the viscosity of the reaction medium is reduced thereby enabling less water to be used or enabling a reduction in the power input if the same amount of water is used.

The organic compound can be added any time prior to the addition of the strong base; however, the full benefits of this invention are not usually achieved unless the compound is added for at least about 0.5 minute prior to the addition of the strong base. Since the organic compounds are generally unreactive with other components which are normally used in such processes, the organic compounds can be mixed with the aqueous mixture for a longer time such as one hour to 48 hours prior to adding the strong base if desired. Furthermore, if desired, an aqueous solution of the organic compounds can be sprayed onto the sodium trimetaphosphate at the time of production of the sodium trimetaphosphate. The sodium trimetaphosphate can be added to a water solution of the organic compound or the organic compounds can be added to an aqueous slurry of sodium trimetaphosphate as desired.

By utilizing the process of this invention a wider variety of raw materials can be employed and a light-colored product is produced. This benefit is particularly important when detergent formulations are produced by slurrying together the sodium trimetaphosphate and other detergent additives, reacting the sodium trimetaphosphate with a strong base such as sodium hydroxide and to form a sodium tripolyphosphate hexahydrate and thereafter drying to the desired moisture level. In most instances it is more desirable to have a light-colored material rather than the darker material which is normally produced from iron contaminated sodium trimetaphosphate, that is, sodium trimetaphosphate which contains at least about 10 p.p.m. of iron, if the organic compounds of the class described herein are not used.

The organic compounds which have been found useful are selected from the group of organic acids consisting of nitrilotriacetic acid, ethylenediamine tetraacetic acid, amino tri(methylene phosphonic acid), 1-hydroxy ethylidene diphosphonic acid, saturated polycarboxylic acids containing from 4 to 12 carbon atoms such as gluconic acid, tartaric acid and citric acid and the water soluble salts of the above acids and mixtures thereof. By water soluble it is meant that at least 0.1 gram of the compound will dissolve in 100 grams of water at 25° C. The water soluble salts of the above organic acids which will normally be used are the alkali metal salts such as sodium, potassium, lithium and the like although if desired, the ammonium salts can be used with good results. Of the alkali metal salts, the sodium and potassium salts are preferred and the sodium salts are especially preferred.

Of the organic compounds, it is preferred to use nitrilotriacetic acid, 1-hydroxy ethylidene diphosphonic acid, amino tri(methylene phosphonic acid), sodium salts of these acids and mixtures thereof.

Although even small amounts of the organic compound can be used to obtain some reduction in viscosity to enable an appreciable decrease in water a weight ratio of organic compound to sodium trimetaphosphate of greater than 1:100 is generally used. In those instances where iron complexing is the primary benefit of the invention desired and the amount of iron present is from 10 p.p.m. to about 50 p.p.m. based on the sodium trimetaphosphate, the weight ratio can be as low as 1:1000. In most instances if sodium trimetaphosphate produced from wet process acid is used, the iron content of the phosphate will be at least 300 p.p.m., therefore it is preferred to use at least a weight ratio of organic compound to sodium trimetaphosphate of at least 1:50. Amounts of the organic compound can be larger if desired; however, it is generally not desirable from a cost standpoint to exceed a 2:1 weight ratio and in most instances a maximum weight ratio of about 1:1 will be utilized.

When the improvement is used to produce a formulated detergent, any of the detergent additives disclosed in U.S. Pat. 3,304,134, Belgium Pat. 633,146 and Canadian Pat. 729,531 as being useful can be used if desired. The foregoing patents are incorporated herein by reference. Although in many instances it will be desirable to formulate a detergent composition so that after the reaction to form sodium tripolyphosphate hexahydrate all that is required is to remove the amount of water necessary to achieve a relatively dry, free-flowing detergent composition, the process does not have to be utilized in this manner as a material consisting essentially of relatively pure sodium tripolyphosphate hexahydrate along with the amount of organic sequestering agent can be produced if desired. Such a product can then be dry blended with other additives to form various formulations useful for a variety of purposes such as industrial cleaner, bottle washing composites and the like.

Surface active agents which can be employed to produce formulated products include the various soaps such as those produced from the saponification of a fatty acid such as palmitic, oleic and the like, and the synthetic organic surfactants including the anionic, nonionic and amphoteric types and mixtures thereof.

Anionic synthetic surface active agents are generally described as those compounds which contain hydrophilic and lyophilic groups in their molecular structure and ionize in an aqueous medium to give anions containing both the lyophilic group and hydrophilic group. The alkyl aryl sulfonates, such as sodium dodecylbenzene sulfonate; the alkyl sulfates, such as sodium dodecyl sulfate; and the alkyl phenol polyoxyethylene ether sulfates, such as sodium tetradecyl phenoxy polyethyleneoxy sulfate, are illustrative of the well-known class of anionic type of surface active compounds which are useful in the practice of this invention.

Nonionic surface active compounds can be broadly described as compounds which do not ionize but acquire hydrophilic characteristics from an oxygenated side chain such as polyoxyethylene and the lyophilic part of the molecule may come from fatty acids, phenol, alcohols, amides or amines. The compounds are usually made by reacting an alkylene oxide such as ethylene oxide, butylene oxide, propylene oxide and the like with fatty acids, the straight or branched chain alcohols, phenols, thiophenols, amides, and amines to form polyoxyalkylene glycol ethers and esters, polyoxyalkylene alkyl phenol and polyoxyalkylene thiophenols, and polyoxyalkylene amides and the like. It is generally preferred to react from about 3 to about 30 moles of alkylene oxide per mole of the fatty acids, alcohols, phenols, thiophenols, amides or amines. Illustrative of the nonionic surface active agents useful in the practice of this invention include alkyl phenol polyoxyethylene ethers, propylene glycol polyoxyethylene ether, alkyl amines polyoxyethylene ethers and the like.

Amphoteric surface active compounds can be broadly described as compounds which have both an anionic and cationic group in their structure. Illustrative of the amphoteric surface active agents useful in the practice of this invention are the amido alkane sulfonates, such as sodium C-tridecyl, N-methyl, amido ethyl sulfonate.

Other individual compounds which are illustrative of the foregoing classes of surface active agents are well known in the art and can be found in standard detergent reference materials such as Surface Active Agents, Schwartz and Perry, Interscience Publishers, Inc., New York, N.Y. (1949).

The inorganic salts which can be used in detergent compositions include the alkali metal sulfates and carbonates, in particular the sodium and potassium sulfates and carbonates. Additionally, in many of the detergent compositions other additives are present such as anti-redeposition agents, brightening agents, corrosion inhibitors, perfumes, dyes, bluing agents and the like. Typical examples of such additives are sodium carboxymethyl cellulose, polyvinyl alcohol, sodium silicate, methyl cellulose and sodium metasilicate.

The detergent additives which can be employed in detergent composition formulations that can be dried by the process of this invention include various inorganic salts and mixtures thereof. Generally, these additives constitute from about 1% to about 35% by weight of the detergent composition and add to the detergency efficiency of the surface active agent.

The following non-limiting examples are presented to further illustrate the invention. All parts, proportions and percentages are by weight unless otherwse specified.

EXAMPLE 1

About 3,060 parts of sodium trimetaphosphate produced from wet phosphoric acid and containing about 650 p.p.m. of iron are slurried with about 1900 parts of water in a reactor equipped with an agitator and a heating coil. To this slurry about 360 parts of trisodium nitrilotriacetate are added while the contents of the reactor are being stirred. The mixture in the reactor is heated to about 50° C. in about five minutes by introducing steam into the heating coil. After the temperature is at 50° C. about 1150 parts of a 70% aqueous solution of sodium hydroxide is added. The reaction of the sodium hydroxide with the sodium trimetaphosphate is evidenced by an evolution of steam from the reactor. The temperature of the contents of the reactor is allowed to reach about 100° C. and then is discharged onto a steam heated conveyor belt where the temperature remains at about 100° C. Steam continues to be evolved from the mass on the conveyor belt and a white solid product is produced. After cooling to room temperature the material is analyzed and analyses of a sample of the product indicate that essentially all of the sodium trimetaphosphate has reacted.

The product is suitable for use in a dry-blended detergent formulation. When the same procedure is followed with the exception that trisodium nitrilotriacetate is not added, a dark colored product is formed and about 5% additional water has to be added and the resultant material is too wet to handle in conventional conveying equipment and is difficult to dry.

EXAMPLE 2

About 100 parts per hour of an aqueous slurry containing about 65% of sodium trimetaphosphate and about 10 parts per hours of 1-hydroxy ethylidene diphosphonic acid are continuously fed into a mixing tank equipped with an agitator to insure complete mixing. The mixture is continuously withdrawn at the same rate it is being added to the vessel, and is added to a reaction vessel equipped with an agitator and a heating coil. About 50 parts per hour of a 50% sodium hydroxide aqueous solution are added to the vessel while maintaining the contents of the reactor at about 110° C. The reaction material is continuously withdrawn and the reaction is allowed to continue on a heated belt. After about 10 minutes retention time on the belt a porous, particulate white product is produced which is suitable for use as a detergent builder.

Essentially the same procedure can be employed wherein aqueous solutions of various detergent actives such as sodium dodecylbenzene sulfonate, sodium lauryl sulfate, nonyl phenol, ethyl ether and other detergent additives such as sodium silicate, sodium carboxy methyl cellulose, sodium sulfate, and the like can be added to the aqueous mixture containing sodium trimetaphosphate and 1-hydroxy ethylidene diphosphonic acid. The level of materials other than water can be as great as 75% by weight, thus enabling less water to be added than is possible without the addition of 1-hydroxy ethylidene diphosphonic acid. Substantially similar results are achieved when the sodium trimetaphosphate contains as much as 720 p.p.m. of iron when the 1-hydroxy ethylidene diphosphonic acid is present in the aqueous slurry of sodium trimetaphosphate at weight levels of from 1:100 to 2:1 based upon the weight of sodium trimetaphosphate.

Substantially similar results can also be achieved when molecular equivalent amounts of ethylenediamine tetraacetic acid, amino tri(methylene phosphonic acid), gluconic acid, tataric acid, citric acid or the water soluble salts of the foregoing acids, or mixtures thereof are substituted for the 1-hydroxy ethylidene diphosphonic acid in this example.

What is claimed is:

1. In a process wherein a strong base is added to an aqueous medium containing sodium trimetaphosphate to form a sodium tripolyphosphate hexahydrate product under alkaline conditions said sodium trimetaphosphate being produced from wet process phosphoric acid and containing at least about 10 p.p.m. iron, the improvement comprising adding an organic compound selected from the group consisting of nitrilotriacetic acid, ethylenediamine tetraacetic acid, amino tri(methylene phosphonic acid), 1-hydroxy ethylidene diphosphonic acid, gluconic acid, tartaric acid, citric acid, the water soluble salts of said acids and mixtures thereof to said aqueous medium prior to adding said strong base; the weight ratio of said organic compound to said sodium trimetaphosphate being from about 1:1000 to about 2:1, respectively.

2. An improvement according to claim 1 wherein said weight ratio of said organic compound to said sodium trimetaphosphate is from about 1:100 to about 1:1.

3. An improvement according to claim 2 wherein said organic compound is selected from the group consisting of nitrilotriacetic acid, 1-hydroxy ethylidene diphosphonic acid, amino tri(methylene phosphonic acid), sodium salts of said acids and mixtures thereof.

4. An improvement according to claim 3 wherein said organic compound is nitrilotriacetic acid.

5. An improvement according to claim 3, wherein said organic compound is 1-hydroxy ethylidene diphosphonic acid.

6. An improvement according to claim 3, wherein said organic compound is amino tri(methylene phosphonic acid).

References Cited
UNITED STATES PATENTS

| | | | |
|---|---|---|---|
| 2,683,343 | 7/1954 | Gillette et al. | 51—282 |
| 3,303,134 | 2/1967 | Shen et al. | 252—135 |
| 3,446,581 | 5/1969 | Smith et al. | 23—107 |
| 3,446,582 | 5/1969 | Smith et al. | 23—107 |

OSCAR R. VERTIZ, Primary Examiner

G. A. HELLLER, Assistant Examiner

U.S. Cl. X.R.

252—135, 138

PO-1050
(5/69)

UNITED STATES PATENT OFFICE
CERTIFICATE OF CORRECTION

Patent No. ___3,574,534___  Dated April 13, 1971

Inventor(s) Kenneth J. Shaver and Chung Yu Shen

It is certified that error appears in the above-identified patent and that said Letters Patent are hereby corrected as shown below:

Kenneth J. Shaver and Chung Yu Shen, St. Louis, Mo., assignors to Monsanto Company, St. Louis, Mo., a corporation of Delaware.

Signed and sealed this 12th day of October, 1971.

(SEAL)
Attest:

EDWARD M. FLETCHER, JR.        ROBERT GOTTSCHALK
Attesting Officer              Acting Commissioner of Patents